Aug. 1, 1950  H. K. ELLIOTT ET AL  2,517,184
GRASS DISPENSER AND MULCHER

Filed Sept. 23, 1946  2 Sheets-Sheet 1

INVENTORS
HAROLD K. ELLIOTT
THELLAR J. JOHNSTON
BY
ATTORNEY

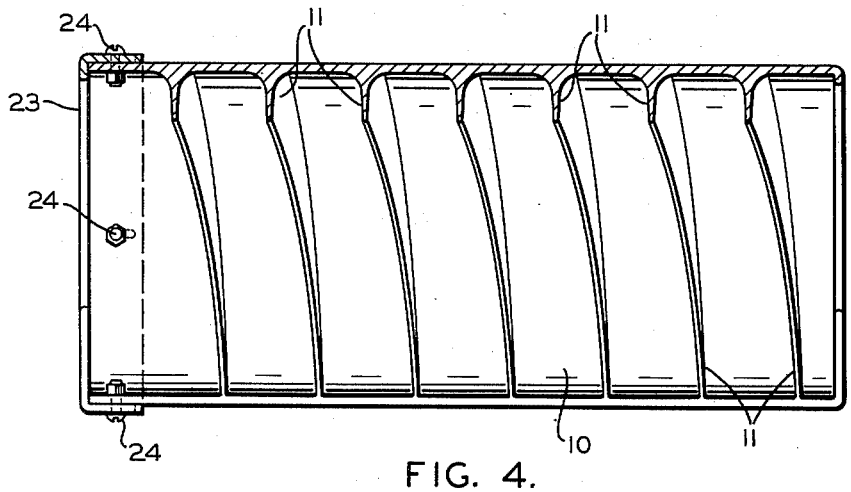
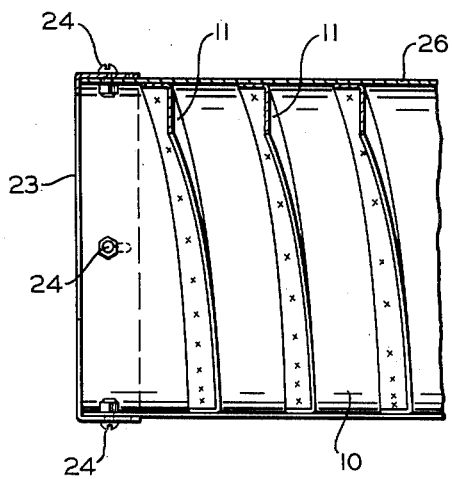
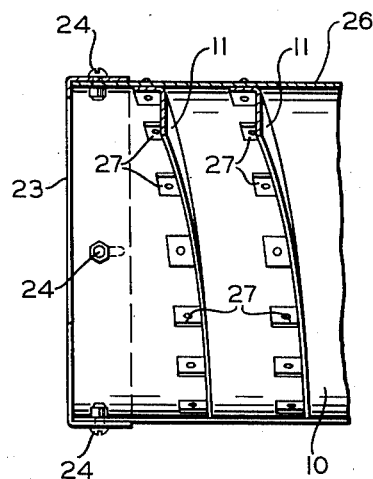

Patented Aug. 1, 1950

2,517,184

UNITED STATES PATENT OFFICE 2,517,184

GRASS DISPENSER AND MULCHER

Harold K. Elliott and Thellar J. Johnston, St. Paul, Minn., assignors to Lawn Mulcher Company, Inc., St. Paul, Minn., a corporation of Minnesota Application September 23, 1946, Serial No. 698,840

7 Claims. (Cl. 56—249)

This invention relates to a grass dispenser and mulcher together with the method of mulching a lawn wherein we provide means adapted to be attached to a lawn mower which includes means for directing the cut grass directly in front of the cutting blades of the lawn mower and as the lawn mower moves forward the cut grass is recut several times and the finely cut grass particles are deposited over the roots of the grass to provide a mulch.

It is a feature of our invention to provide an adjustable hood which may be attached to any lawn mower which acts to direct the cut grass forwardly of the moving lawn mower so that the grass will be recut before it falls to the ground.

A further feature of our invention resides in providing a hood which may be attached to a lawn mower, which hood rests at the bottom on the back of the cutting bar and the hood extends over the blades to a position forwardly of the blades. Thus the hood forms a shield over the cutting blades and also provides an air passage way leading from the cutting bar over the blades and to the front of the lawn mower. The air passage way formed by the hood over the cutting blades of the lawn mower is divided by a series of internal ribs which curve toward the left when looking into the hood forwardly of the lawn mower. The function of the ribs or vanes in the hood are to redirect the cut grass from being forced towards one end of the lawn mower. If the lawn mower is made with its blades to direct the cut grass to the left, then the vanes or ribs in the hood will be formed to curve spirally to the right when looking into the front of the hood.

The hood for the lawn mower is made with an adjustable end so that it may be lengthened or shortened to accommodate the length of the blades of the particular lawn mower to which the mulching hood is attached.

We provide a method of mulching lawns or grass which consists in cutting the grass and directing the cut grass in front of suitable cutting blades in a manner so that the cutting blades will recut the grass again and again until the cut grass is reduced to fine cut particles and then laying the finely cut grass as a mulch over the roots of the standing grass.

It is a feature of our invention to provide means which may be attached to the standard lawn mower which will cause the cut grass to be evenly deposited in front of the lawn mower and to provide a draft of air by the movement of the cutter blades which draws the cut grass over the cutting blades to cut the blades of grass into fine particles which are evenly separated over the ground in front of the lawn mower mulching the roots of the grass, therefore protecting the lawn from burning and drying out and also discouraging weed growth.

A feature of our invention resides in providing a guard over the cutting blades of the lawn mower and also preventing the cut grass from being discharged from out of the back of the lawn mower or out of the side thereof but rather blowing the cut grass directly in front of the lawn mower where it can be recut by the revolving blades.

Some of the advantages which our grass dispenser and mulcher provide reside in doing away with a grass catcher, overcoming brown or wilted grass windrows on the lawn. Our method of mulching grass stimulates the growth of the same because of the plant food that is in the grass mulch.

Further if our method of mulching the grass is used continuously throughout the cutting season, each time the grass is cut a further deposit of mulch is laid over the ground around the roots of the grass which prevents drying out of the lawn and thus largely eliminates burned or dried spots on a lawn caused by the sun and the lack of moisture to the roots. We have found that our method of mulching creeping bent grass lawns increases the growth of the creeping bent grass by reason of the mulch and due to the fact that bent clippings will grow.

These features together with other details and objects of our invention will be more fully and clearly hereinafter defined. In the drawing forming a part of this specification:

Figure 4 is a longitudinal section on the line 4—4 of Figure 1 through the hood and not the lawn mower.

Figure 5 is a detail of a section through the mulching hood illustrating an alternative construction.

Figure 6 is also a detail section of the mulching hood illustrating still another form of construction of the hood.

Figure 1:
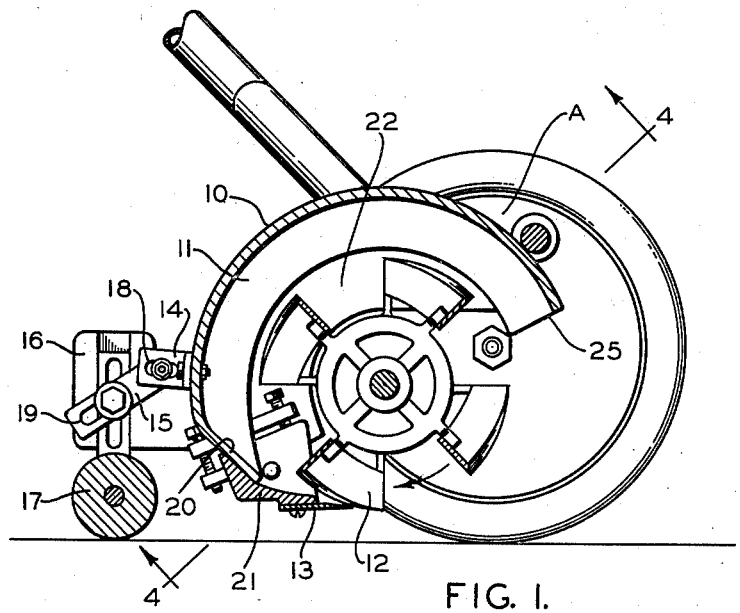
Figure 1 is a sectional side elevation through a standard lawn mower showing mulcher hood attached thereto.
Figure 2:
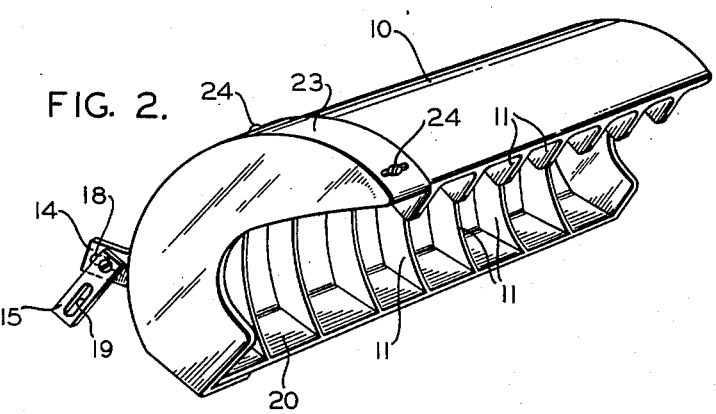
Figure 2 is a perspective of our mulcher hood removed from the lawn mower.
Figure 3:
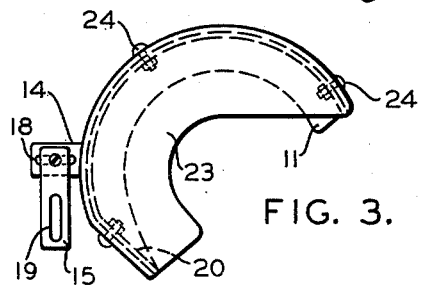
Figure 3 is an end view of our mulcher hood for lawn mowers.

The sections shown in Figures 5 and 6 are approximately on the same line 4—4 of Figure 1.

We have provided a method of mulching lawns and in carrying out our method we employ a hood 10 which we have illustrated attached to a standard lawn mower A as shown in section 1.

The hood 10 is arcuate and adapted to be attached to the lawn mower A so that it will cover and act as a guard over the cutting blades extending from the back of the cutting bar over the top of the blades and down at the front of the lawn mower as illustrated in the drawings. The hood 10 is formed with a series of internal peripheral ribs or baffles 11 which are positioned to curve spirally either towards one end or the other of the hood 10 so that the cut grass from the blades 12 and the cutter blade 13 is adapted to be carried under the hood between the ribs or vanes and deposited in a stream of cut grass directly in front of the lawn mower A.

In the operation of the lawn mower A as the blades 12 rotate under the hood 10 they set up a current of air which acts to draw the cut grass back to the cutter blade 13 and thus the cut grass is recut again and again until it is in fine particles which are blown into the standing uncut grass to form a layer of mulching for the roots of the grass.

The hood 10 is adjustably secured by the bracket arms 14 which are positioned at each end of the hood and which are connected by the links 15 to the frame 16 of the lawn mower which ordinarily supports the roller 17. The brackets 14 are formed with slots 18 while the links 15 are formed with the slots 19 which provide adjusting means for attaching the hood 10 to the lawn mower A. The hood 10 is formed with a base portion 20 which is adapted to rest on the back of the cutting bar support 21. In this manner the hood 10 may be readily attached to any standard lawn mower and adjusted into the desired position to form a space 22 into which the cut grass is carried by the draft of air set up by the blades 12 as well as by the blades themselves as they rotate in the operation of the lawn mower A.

The spirally positioned baffles or ribs 11 direct the cut grass away from the ends of the cutting bar 13, as it is ordinarily thrown by the cutter blades 12 of the lawn mower, to direct the cut grass in a stream right in front of the moving lawn mower. Thus the hood 10 acts to confine the cut grass under the hood and carry it out in front of the moving lawn mower.

In the movement of the lawn mower as it cuts the grass, the stream of cut blades of grass is blown out from the front of the hood 10 where these cut blades of grass are drawn under the cutter blade 13 by the air current set by the blades 12, if the cut blades of grass are not already finely cut. When the blades of grass have been cut into fine particles these particles are deposited as a mulch evenly spread over the roots of the grass.

We have found that in the operation of our mulching hood for grass that if the cut blades of grass are fairly long they will be blown between the upstanding uncut blades of grass and will virtually stand erect. As the lawn mower travels forward it will pick up these long cut blades of grass and recut them into fine particles, this forms a grass mulch for the roots of the lawn.

The repeated operation of mulching a lawn by our method will stimulate the growth of the grass like a fertilize mulch and will prevent the grass from drying out at the roots and will largely overcome the weed growth between the grass blades.

Our mulcher hood 10 may be readily removed when desired to clean the same or replace it when worn out or when it is desired to get at the blades of the lawn mower. The hood 10 is formed with an extension end 23 which is adjustably supported by the bolts 24 to lengthen or shorten the hood 10 longitudinally. Thus the mulching hood 10 is adjustable for different width lawn mowers which eliminates the necessity of having hoods of different lengths. However without departing from the spirit of this invention the mulching hood 10 may be made of the desired length so as to accommodate the length of the cutting bar of the particular lawn mower to which it is to be attached.

In the construction of the hood 10 in the Figures 1, 2, 3, and 4 the body of the hood may be formed with the baffles or ribs 11 cast integral with the cylindrical body and projecting inwardly of the body to form baffles which draw the cut grass over the blades and out in front of the lawn mower where the grass is recut.

The baffles 11 may vary in width from the bottom of the hood 10 to the grass discharge end 25 as illustrated in Figure 1.

It is important that the baffles 11 extend either to one side or the other from the bottom like a segment over a spiral so as to guide the cut grass directly in front of the moving lawn mower.

In Figure 5 we have shown an alternate form of the hood 10. In this form of the hood the baffles 11 are formed with a right angularly end or base portion which is adapted to be spot welded to the outer sleeve like body 26 of the hood 10. The baffles 11 in the form Figure 5 may be otherwise secured in place if desired.

In Figure 6 we have shown still another form of the baffles 11. In this form of the baffles 11 a series of flanges 27 are formed to the base of the baffles or ribs and these flanges are secured to the sleeve body 26.

Where the hood 10 is made with a sleeve like body 26 the baffles may be secured in any suitable manner, it being important that the baffles be held firmly in place so as to direct the cut grass in front of the moving lawn mower.

With our method of mulching a lawn the need for a fertilizer will be greatly reduced and may in some cases be eliminated. Furthermore with our mulcher method a lawn may be kept smooth and even without rows of cut grass extending over the lawn and thus we largely eliminate the streaks which are so often seen in lawns caused by the dried cut grass which builds up in rows and spoils the appearance of a lawn if it is not raked from the lawn.

A further feature of our mulcher resides in providing a means of utilizing the current of air set up by the revolving lower blades which act to draw the longer blades of grass which have been cut from the lawn back into the mower where it is cut up into a fine state before it is finally deposited as a mulch to the ground.

With our mulcher we have found that leaves as well as grass will be cut into fine particles so that they can be deposited on the ground in a manner to form a mulch for the grass roots and to make it virtually unnecessary to rake the lawn. Where the leaves are rather thick it may be necessary to go over the same several times to reduce them into a fine form so that they may be redeposited as a mulch on to the ground. We believe this is a material advantage of our mulcher because it saves the necessity of raking the lawn of leaves and adds the benefit of mulch for the grass.

We claim:

1. A grass dispenser and mulcher for a lawn mower, including a hood over the cutting blades of the lawn mower, baffles on the inside of said hood to direct the cut grass away from one end of the cutting blades to evenly distribute the cut grass along the lawn mower and to deposit the cut grass directly in front of the lawn mower to cause the cut grass to be recut into fine particles and dispensed onto the ground to mulch the grass.

2. A grass mulcher for a lawn mower comprising a hood over the cutting blades of the mower and means in said hood for directing a stream of cut grass in front of the mower to cause the cut grass to be recut into fine particles which are deposited between the blades of grass on the ground to lay a mulch over the grass roots.

3. A grass mulcher for a lawn mower, including an adjustable hood, means for adjustably setting said hood over the cutter blades of the lawn mower, and means in said hood causing cut grass to be directed in front of the cutting blades in a stream of grass which stream of cut grass is drawn by an air current set up by the cutter blades into the lawn mower to recut the cut grass and deposit the finely cut grass on the ground to mulch the grass roots.

4. A grass mulcher for a lawn mower including a hood having a body of a segment of a cylinder adapted to extend over the blades of the lawn mower, a series of spirally positioned baffles extending internally of said hood, means for adjustably attaching said hood to the lawn mower and an adjustable extension end formed on said hood to lengthen said hood.

5. The combination of a lawn mower having a series of spirally positioned cutter blades, a cutter bar against which said blades are attached to engage to cut grass, a hood adapted to extend over said cutting blades, a base portion formed on said hood adapted to rest on said cutting bar, means for securing said hood to said lawn mower, a series of baffles positioned internally of said hood and extending with their free edges in close proximity to said spirally disposed blades of said lawn mower to provide channels from said cutting bar to the front of said lawn mower which are adapted to act as chutes for cut grass to discharge the cut blades of grass directly in front of the moving lawn mower, said spirally disposed lawn mower blades set up a current of air under said hood which are adapted to draw the long blades of cut grass back to the cutting means of said lawn mower to cut virtually all of the grass into short pieces which are driven onto the ground by force as they are carried from said hood to provide a grass mulch for the ground.

6. A grass mulcher for a lawn mower comprising an arcuate hood over the cutting blades of the mower and internal peripheral means in said hood for directing hay in front of the mower to cause the cut grass to be recut into fine particles which are deposited between the blades of grass on the ground to lay a mulch over the grass roots.

7. A grass dispenser and mulcher for a lawn mower, including an arcuate hood partially surrounding the cutting blades of the lawn mower and extending from the back of the cutting bar of the lawn mower over the top of such blades, spirally arranged baffles on the inside of said hood to direct the cut grass in a direction away from one end of the cutting blades and even distribute the cut grass along the lawn mower, said blades in rotation generating an air current beneath said hood whereby the cut grass is conveyed from the cutter bar around the hood to the front of the lawn mower to be recut into fine particles, which fine particles are finally dispensed onto the ground to form a mulch.

HAROLD K. ELLIOTT.
THELLAR J. JOHNSTON.

REFERENCES CITED

The following references are of record in the file of this patent:

UNITED STATES PATENTS

| Number | Name | Date |
| --- | --- | --- |
| 683,197 | Braun | Sept. 24, 1901 |
| 1,332,495 | Graham | Mar. 2, 1920 |
| 1,458,936 | Hart | June 19, 1923 |
| 2,066,174 | Cregier | Dec. 29, 1936 |
| 2,105,803 | Barnes | Jan. 18, 1938 |
| 2,162,783 | Moyer | June 20, 1939 |
| 2,246,352 | Falkiner | June 17, 1941 |
| 2,256,219 | Ronning | Sept. 16, 1941 |

FOREIGN PATENTS

| Number | Country | Date |
| --- | --- | --- |
| 411,233 | Great Britain | June 7, 1934 |